United States Patent [19]
Davies et al.

[11] 3,830,341
[45] Aug. 20, 1974

[54] LUBRICATION SYSTEM FOR A MOTOR COMPRESSOR UNIT

[75] Inventors: Stanton Davies; Tadek M. Kropiwnicki, both of Syracuse, N.Y.

[73] Assignee: Carrier Corporation, Syracuse, N.Y.

[22] Filed: Nov. 24, 1972

[21] Appl. No.: 309,393

[52] U.S. Cl.............. 184/6.16, 184/6.18, 417/372
[51] Int. Cl......................... F01m 1/00, F04b 39/02
[58] Field of Search ............... 417/94, 98, 372, 902; 184/6.16, 6.18, 6.24

[56] References Cited
UNITED STATES PATENTS

| | | | |
|---|---|---|---|
| 3,182,901 | 5/1965 | Solomon............................ | 417/372 |
| 3,674,382 | 7/1972 | Kubota et al...................... | 184/6.18 |
| 3,692,435 | 9/1972 | Iida et al........................... | 184/6.18 |

Primary Examiner—Manuel A. Antonakas
Attorney, Agent, or Firm—J. Raymond Curtin; Barry E. Deutsch

[57] ABSTRACT

A lubrication system for a motor-compressor unit, including a crankshaft suitably connected to the rotor of said compressor motor for rotation thereby. The crankshaft includes an eccentric bore provided therethrough for the passage of oil from a reservoir to the bearings journaling the crankshaft. A suitable opening is provided for communicating a first portion of the eccentric bore with a space remote from the bearings. Foreign particles entrained in the lubricating oil are collected in the first portion of the eccentric bore. The foreign particles pass from the first portion of the bore through the opening to the space remote from the bearings to prevent the foreign particles from being provided to the bearings.

3 Claims, 3 Drawing Figures

LUBRICATION SYSTEM FOR A MOTOR COMPRESSOR UNIT

BACKGROUND OF THE INVENTION

This invention relates to lubrication systems for motor-compressor units of the type generally used in hermetically sealed refrigerant units, and in particular to such a system wherein foreign particles entrained in the oil are prevented from being provided to the bearings of the compressor.

The utilization of hermetically sealed refrigerant compressor-motors has become increasingly prevalent in recent years, particularly in air conditioning applications such as room air conditioning units. The compressors are generally driven by two-pole electric motors. The crankshaft of the compressor thus rotates at approximately 3,500 revolutions per minute. As is obvious, at such relatively high operating speeds, the proper lubrication of the bearings journaling the crankshaft is highly critical. Any lubrication problems when operating at such high speeds may result in bearing failure thus causing complete loss of the hermetically sealed compressor.

One of the prime causes of bearing failure is due to the lubricating oil having foreign matter entrained therein. The foreign matter entrained in the lubricating oil includes iron particles which remain in the sealed unit after the manufacturing process, or are formed by the wearing of parts during normal operation of the compressor. The foreign matter, such as the iron particles, if delivered into contact with bearing surfaces, will eventually ruin the surfaces, thus sharply reducing the operating life of the compressor. As is obvious, it is extremely desirable to prevent such foreign particles from being delivered to the bearings.

SUMMARY OF THE INVENTION

It is therefore an object of this invention to prevent foreign particles entrained in the lubricating oil of a compressor from being delivered to the bearings journaling the crankshaft.

It is a further object of this invention to include means to prevent the passage of foreign particles to the bearings and to deliver such particles to a void space defined by the shell of the hermetic assembly.

It is a further object of this invention to prevent deterioration of the bearings of a motor compressor by interrupting the flow of foreign particles thereto without substantially increasing the manufacturing cost of such compressor.

These and other objects of the present invention are obtained by providing a groove or suitable relief opening upstream from the conduits delivering the lubricating oil to bearings journaling the compressor's crankshaft. The relief opening communicates at one end thereof with the main oil passage provided in the crankshaft. The other end of the relief opening terminates in a void space, such as the interior space defined by one of the shells of the hermetic compressor. The foreign particles are generally heavier than the lubricating oil and move by gravity to a first portion of the main crankshaft passage. The relief opening is in communication with the first portion of the oil passage. Foreign particles pass through the relief opening and thence to the void space thereby being prevented from coming into contact with the bearing surfaces.

A more complete understanding of the present invention may be obtained from the following detailed description when taken in connection with the accompanying drawings.

DESCRIPTION OF THE PREFERRED EMBODIMENT

Figure 1:
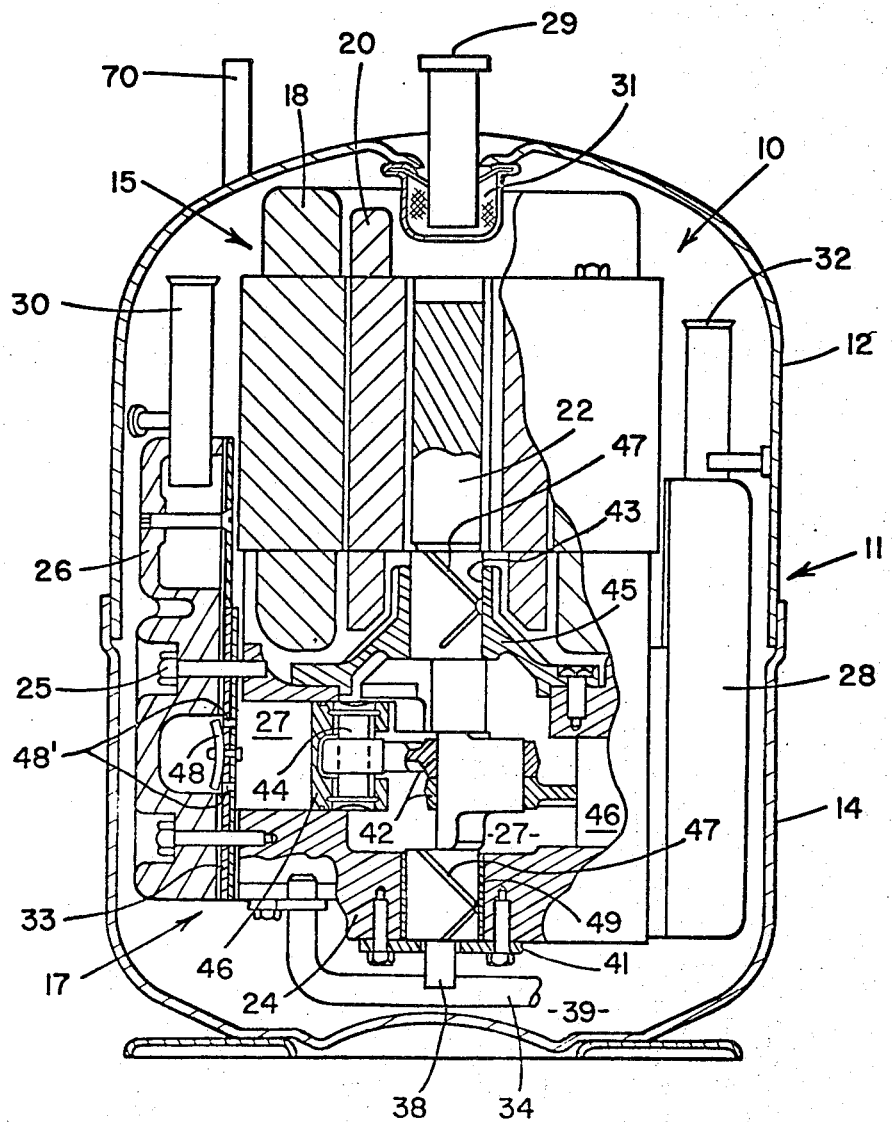
FIG. 1 is a longitudinal sectional view of a hermetically sealed compressor embodying the present invention.

Referring to the drawings, there is shown a hermetically sealed motor-compressor unit embodying the lubrication system in accordance with this invention. Such a motor-compressor unit is typically employed in a mechanical refrigeration system. The hermetically sealed motor-compressor unit is generally indicated at 10. The unit is housed within a shell generally indicated at 11 having an elliptical cross-sectional shape. Shell 11 is fabricated of lower shell section 14 and upper shell section 12 which are welded together. An electric motor generally indicated at 15 and a compressor generally indicated at 17 are disposed within shell 11. Compressor 17 is axially aligned with motor 15 and is disposed therebelow.

Motor 15 includes stator 18 and rotor 20, the rotor being operably connected to drive crankshaft 22. The crankshaft is supported within cylinder block 24 of compressor 17.

The cylinder block defines cylinders 27 of the compressor. Enclosing the cylinders are cylinder heads 26 and 28, secured to the cylinder block by bolts 25. Pistons 46 are disposed within cylinders 27 for reciprocal movement therein. Any desired number of cylinders may be employed. Connecting the pistons to the eccentric portion of crankshaft 22 are connecting rods 42 and wrist pins 44. The desired reciprocating movement of the pistons is obtained by rotation of the crankshaft as is obvious to those skilled in the art.

The hermetically sealed motor-compressor unit embodying the present invention is typically employed in a mechanical refrigeration system. The refrigerant gas to be compressed, enters into the shell of the compressor via inlet 29. The gas passes through inlet 29 and screen 31 and thereafter flows over the windings of motor 15 to cool the same in a manner well known to those skilled in the art. Screen 31 is included to separate any undesirable foreign particles that may be entrained in the entering refrigerant gas.

The refrigerant gas, after having cooled the windings of the motor, enters into the compressor portion of the unit via inlet tubes 30 and 32 disposed in the top portion of cylinder heads 26 and 28.

The refrigerant gas enters each of the cylinders 27 of the compressor via suction ports (not shown) which are formed in valve plate 33.

The gas, after it is compressed by operation of the piston, enters into an appropriate portion on the cylinder head through discharge ports 48 formed in valve plate 33. Discharge valve 48, connected to plate 33, regulates the flow of gas from the cylinder.

The discharged high pressure gas passes through internal bores of the cylinder block in a manner which is more fully explained in commonly assigned co-pending application, Ser. No. 96,792, filed Dec. 10, 1970, in the names of Harvey G. Stenger, George T. Privon and Salvatore Buonocore, and now U.S. Pat. No. 3,785,453. Undesirable sound produced by the pulsating nature of the discharge gas is attenuated by passing through the bores of the cylinder block. The gas thereafter flows through discharge line 34 which connects with discharge outlet 70 provided for transmitting the compressed gas to the other components of the refrigeration unit.

Figure 3:
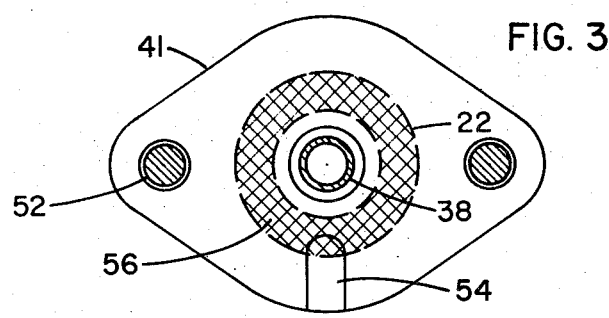
FIG. 3 is a sectional view taken along lines 3—3 of FIG. 2.
Figure 2:
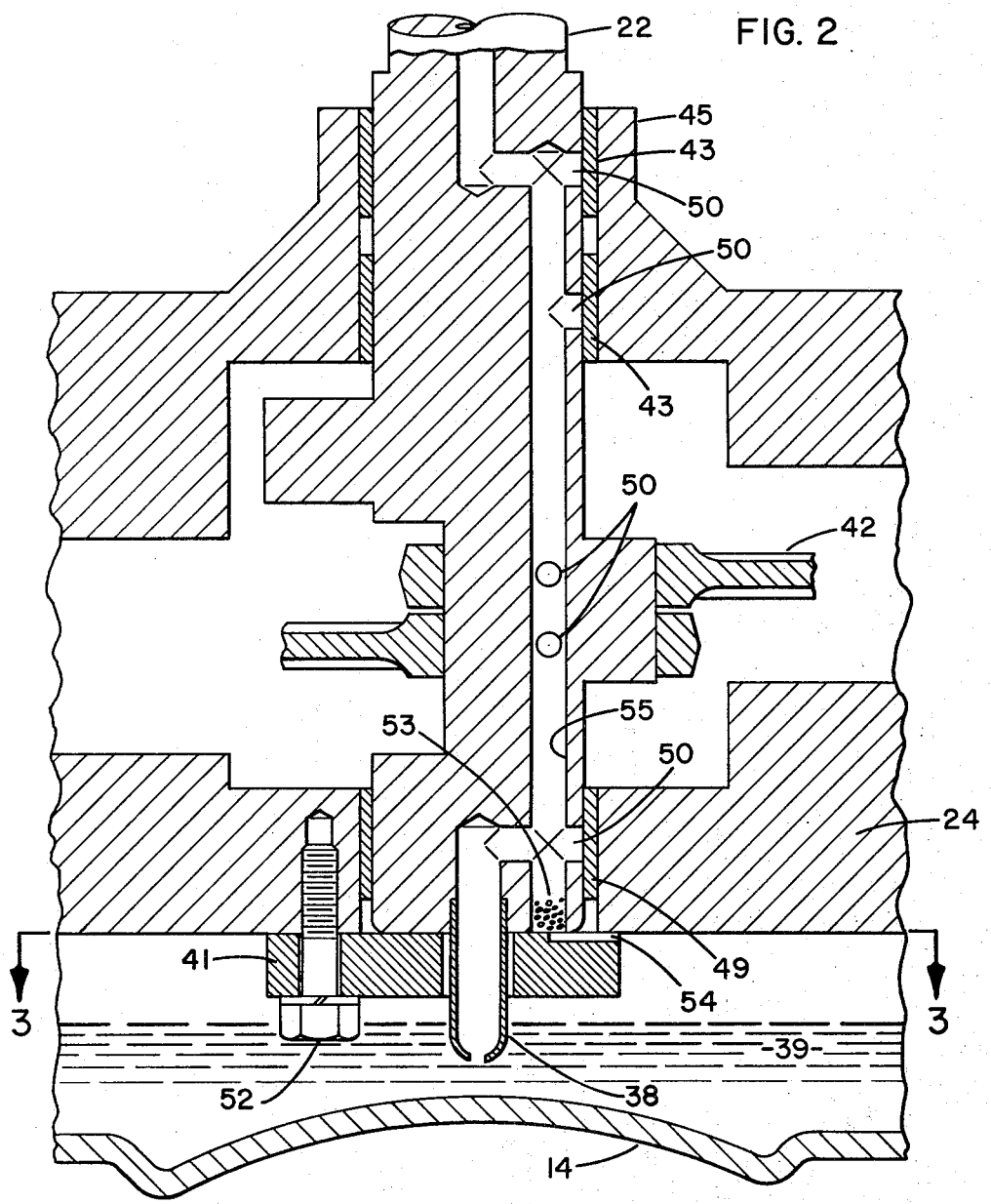
FIG. 2 is an enlarged sectional view of a portion of the compressor illustrated in FIG. 1, showing a more detailed view of the present invention.

With particular reference to FIGS. 2 and 3, the lubrication system in accordance with the present invention is shown in detail. The lubricating oil is stored in oil reservoir or sump 39 of the compressor, which is defined by lower shell section 14. Oil pickup tube 38 extends into the oil reservoir, so as to have its inlet below the surface of the oil. The tube is press fitted into an appropriate aperture formed in the bottom of crankshaft 22. Tube 38 passes through a suitable opening in thrust bearing 41. The thrust bearing is secured to the bottom surface of cylinder block 24 by appropriate means, such as bolts 52. A relief opening or groove 54 is formed in the top surface of thrust bearing 41 for a reason to be more fully explained hereinafter. During normal operation, rapid rotation of the tube caused by rotation of the crankshaft, produces a vacuum at the tube's inlet, causing oil to flow thereinto.

Crankshaft 22 has an internally bored eccentric passage 55 provided therein which communicates with the upper end of tube 38. The centrifugal force developed by the oil passing into the rotating eccentric passage 55 provides the necessary force for moving the oil through the passage. Feed holes 50 communicate the oil passage with bearing surfaces 43 and 49. Grooves 47 (See FIG. 1) are provided on the outer surface of crankshaft 22 and communicate bearings 43 and 49 with feed holes 50 to provide oil to the bearings.

During the manufacture of the compressor, the various components thereof are subjected to many machining processes. Such machining steps often cause relatively fine particles of metal to remain on the surfaces of the components. Although the compressor is subjected to rigorous cleaning processes, many of the fine particles of metal remain in the final compressor assembly. Additional metal particles are formed as a result of normal wear of the various parts. The foreign matter often becomes entrained in the lubricating oil. As is obvious, if such foreign matter were to be brought into contact with the bearing surfaces of the compressor, the bearings would soon be ruined. As the compressor is hermetically sealed, the bearings cannot be repaired, but rather the entire compressor assembly must be replaced. This is highly costly. It is thus readily apparent that it is highly desirable to prevent the foreign matter, such as metal particles, entrained in the lubricating oil from contacting the bearing surfaces of the compressor assembly.

The foreign particles, being heavier than the oil in which they are entrained, generally gravitate to the bottom 53 of passage 55. If a sufficient quantity of such particles were to accumulate therein, the particles would eventually be brought into contact with the bearing surfaces as a result of the passage of the lubricating oil thereto.

To obviate the foregoing, groove or relief opening 54 is provided in thrust bearing 41. The groove communicates the lower portion 53 of passage 55 with the interior surface of shell 11. The interior surface of shell 11 is remote from the bearing surfaces.

The rotation of crankshaft 22 will bring eccentric bore 55 into alignment once every revolution with groove 54. Reference numeral 56, see FIG. 3, represents the path of travel of eccentric passage 55. The foreign particles accumulated in lower portion 53 will pass from the passage, through the groove 54, and thence into the interior portion of shell 11. Thus, the foreign particles are prevented from contacting the bearing surfaces.

The lubrication system in accordance with the present invention effectively prevents any damage to the bearing surfaces of the compressor thus prolonging the operable life thereof. In addition, the present invention may be readily implemented without increasing the cost of manufacturing a compressor. The foregoing are desirable features in the highly competitive and cost conscious compressor industry.

While a preferred embodiment of the present invention has been disclosed and described, the invention should not be limited thereto, but may be otherwise embodied within the scope of the following claims.

We claim:

1. A lubrication system for a hermetically sealed compressor including first and second shells united together to house said compressor, a crankshaft having an eccentric bore provided therethrough, means to rotate said crankshaft, means defining a reservoir of lubricating oil in one of said shells, said lubricating oil having foreign particles entrained therein, and bearing means journaling said crankshaft, said lubrication system comprising:

A. pump means communicating said reservoir means and said eccentric bore for delivering lubrication oil from said reservoir means to said eccentric bore, the foreign particles entrained in said lubrication oil being collected in a first portion of said eccentric bore;

B. a thrust bearing journaling said pump means;

C. conduit means communicating said eccentric bore and said bearing means to provide lubricating oil to said bearing means; and D. means defining a groove in said thrust bearing, one end of said groove being alignable with said first portion of said eccentric bore once during each revolution of said crankshaft, the other end of the groove opening into one of said shells, the foreign particles collected in said first portion of said bore passing through said groove and being deposited in one of said shells to prevent said foreign particles from being provided to said bearing means.

2. A lubrication system for a hermetically sealed compressor including a crankshaft, means to rotate said crankshaft, means defining a reservoir of lubricating oil, said lubricating oil having foreign particles entrained therein, and bearing means journaling said crankshaft, said lubrication system comprising:

A. passage means provided in said crankshaft for the passage of lubricating oil therethrough, the foreign particles entrained in said lubricating oil being accumulated in a first portion of said passage means;

B. pump means communicating with said reservoir means and said passage means, said pump means delivering lubricating oil from said reservoir means to said passage means;
C. conduit means communicating said passage means and said bearing means to provide lubricating oil to said bearing means; and
D. means for receiving said accumulated foreign particles to prevent said foreign particles from being provided to said bearing means, said receiving means including a thrust bearing journaling said pump means and being alignable with said passage means in said crankshaft so that the foreign particles accumulated in said first portion of said passage means will move therefrom into said receiving means.

3. A lubricating system in accordance with claim 2 wherein said thrust bearing includes a relief groove formed therein, one end of said groove being alignable with said first portion of said passage and the other end of said groove being in communication with a space remote from said bearing means.

* * * * *